United States Patent
Deenadhayalan et al.

(10) Patent No.: US 9,760,485 B2
(45) Date of Patent: Sep. 12, 2017

(54) FAST WRITE AND MANAGEMENT OF PERSISTENT CACHE IN A SYSTEM THAT INCLUDES TERTIARY STORAGE

(71) Applicant: International Business Machines Corporation, Armonk, NY (US)

(72) Inventors: Veera W. Deenadhayalan, San Jose, CA (US); Wayne C. Hineman, San Jose, CA (US); Robert M. Rees, Los Gatos, CA (US); Anurag Sharma, Fremont, CA (US); Pin Zhou, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 39 days.

(21) Appl. No.: 14/607,237

(22) Filed: Jan. 28, 2015

(65) Prior Publication Data

US 2016/0217073 A1    Jul. 28, 2016

(51) Int. Cl.
*G06F 12/08*      (2016.01)
*G06F 12/0804*    (2016.01)
*G06F 12/0868*    (2016.01)

(52) U.S. Cl.
CPC ...... *G06F 12/0804* (2013.01); *G06F 12/0868* (2013.01); *G06F 2212/1024* (2013.01); *G06F 2212/213* (2013.01); *G06F 2212/222* (2013.01); *G06F 2212/224* (2013.01); *G06F 2212/312* (2013.01)

(58) Field of Classification Search
CPC .. G06F 2212/213; G06F 3/0601; G06F 3/061; G06F 3/064; G06F 12/08; G06F 12/0802; G06F 12/0804; G06F 12/0815; G06F 12/0868; G06F 12/0893; G06F 12/0897; G06F 11/1471; G06F 17/30138
USPC ................. 711/100, 118, 113, 141
See application file for complete search history.

(56) References Cited

U.S. PATENT DOCUMENTS

| | | | |
|---|---|---|---|
| 5,636,360 A | 6/1997 | Courts et al. | |
| 5,694,570 A * | 12/1997 | Beardsley | G06F 3/0601 711/113 |
| 6,516,380 B2 | 2/2003 | Kenchammana-Hoskote et al. | |
| 7,047,355 B2 * | 5/2006 | Nakatani | G06F 11/1435 707/E17.01 |

(Continued)

OTHER PUBLICATIONS

Lee, Sang-Won, et al. "A log buffer-based flash translation layer using fully-associative sector translation." ACM Transactions on Embedded Computing Systems (TECS) vol. 6., No. 3 (2007): Article 18, 27 pages.

*Primary Examiner* — Ann J Lo
*Assistant Examiner* — Tracy A Warren
(74) *Attorney, Agent, or Firm* — Cantor Colburn LLP; Bryan W Butler (57) ABSTRACT

Embodiments of the invention relate to receiving a write request that includes a write data and an address of a target block in tertiary storage. In response to the write request, a write-miss is detected at a cache located in persistent storage. Based on detecting the write-miss, the write data and associated metadata are written to a fast write storage location and the write request is marked as complete. In addition, the target block is retrieved from the address in the tertiary storage and stored in the cache. Contents of the fast write storage location are merged with the contents of the target block in the cache.

19 Claims, 4 Drawing Sheets

(56) References Cited

U.S. PATENT DOCUMENTS

| | | |
|---|---|---|
| 7,257,690 B1 | 8/2007 | Baird |
| 8,037,033 B2 | 10/2011 | Cong et al. |
| 8,135,928 B2 | 3/2012 | Ozdemir |
| 8,285,956 B2 | 10/2012 | Ozdemir |
| 8,661,068 B1 | 2/2014 | Seibel et al. |
| 9,104,599 B2 * | 8/2015 | Atkisson ............... G06F 11/108 |
| 2013/0042156 A1 | 2/2013 | Srinivasan et al. |
| 2013/0191601 A1 | 7/2013 | Peterson et al. |
| 2013/0275700 A1 | 10/2013 | Wang et al. |

* cited by examiner

FAST WRITE AND MANAGEMENT OF PERSISTENT CACHE IN A SYSTEM THAT INCLUDES TERTIARY STORAGE

BACKGROUND

The present invention relates generally to cache storage, and more specifically, to fast write and management of persistent cache in a system that includes tertiary storage.

SUMMARY

Embodiments include a method, system and computer program product for fast write and management of persistent cache in a system that includes tertiary storage. A write request that includes a write data and an address of a target block in tertiary storage is received. In response to the write request, a write-miss is detected at a cache located in persistent storage. Based on detecting the write-miss, the write data and associated metadata are written to a fast write storage location and the write request is marked as complete. In addition, the target block is retrieved from the address in the tertiary storage and stored in the cache. Contents of the fast write storage location are merged with the contents of the target block in the cache.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

For many companies today data represents their value and the amount of data requiring storage is growing at an exponential rate. Much of this data includes semi-active and/or unstructured data that is often not well suited for storage in traditional database systems. Due to the ever increasing volume of corporate data that must be stored, even relatively low cost consumer-grade serial advanced technology attachment (SATA) disks may prove to be very costly.

Tape storage, which is an example of one type of tertiary storage, is generally inexpensive and dense, and thus, is a good candidate for the main storage of massive amounts of corporate data. Drawbacks to the use of tapes are related to their sequential write nature and to their relatively long access latency. To improve access latency, persistent low-latency cache, such as serial attached small computer system interface (SAS) disks and/or flash devices, can be added at the front-end of the main storage (tapes) and used for both reads and writes. However, latency can still suffer when a cache miss occurs and access to contents of a tape is required to satisfy a data access request.

Embodiments are directed to decreasing write latency when a write-miss is detected in a storage system that includes tertiary storage, such as tape storage, front-ended by a persistent low-latency cache. Embodiments can be used in systems where the size of the data block being written by an application is smaller than the size of the tape block, that is, the tape block contains multiple application blocks. In systems where the application block is smaller than the tape block, a write operation is performed by fetching the data stored on the tape in the block containing the logical block address (LBA) specified by the write request, and then merging the write data into the fetched block before writing it back to the tape. Having the tape storage front-ended by a cache can improve write latency when the target block being written to by a write request is located in the cache. However, in contemporary storage systems, when the target block is not in the cache (i.e., a "write-miss" occurs), the target block has to be retrieved from a tape and stored into the cache in order to complete the write request. The requirement to wait until the target block is read and then stored into the cache before completing a write request is eliminated by embodiments described herein.

By utilizing a fast write to a persistent storage location when a write-miss occurs, the write instruction does not have to wait until the target block is retrieved from the tape in order to complete the write request. Instead, in accordance with embodiments, once the data is written to the persistent storage location the write request can complete. At a later time, once the target block is retrieved from tape and stored in the cache, contents of the persistent storage location are reconciled with contents of the retrieved target block. In this manner, embodiments can decrease write latency in the storage system.

As used herein, the term "tertiary storage" refers to a third level of storage in a storage hierarchy that includes a first level of volatile primary storage (or main memory) that is directly accessible by a central processing unit (CPU), a second level of non-volatile secondary storage that is not directly accessible by the CPU, and the third level of storage. The third level of storage includes tertiary storage that can be implemented by a robotic mechanism for mounting (or inserting) and dismounting removable media into a storage device according to system demands for data on the storage media. Examples of tertiary storage include, but are not limited to: tape storage, removable mass storage devices, and robotic mountable optical device storages. Features of embodiments are described herein with reference to tape storage. Embodiments are not limited to tape storage and can be utilized with any tertiary storage.

Figure 1:
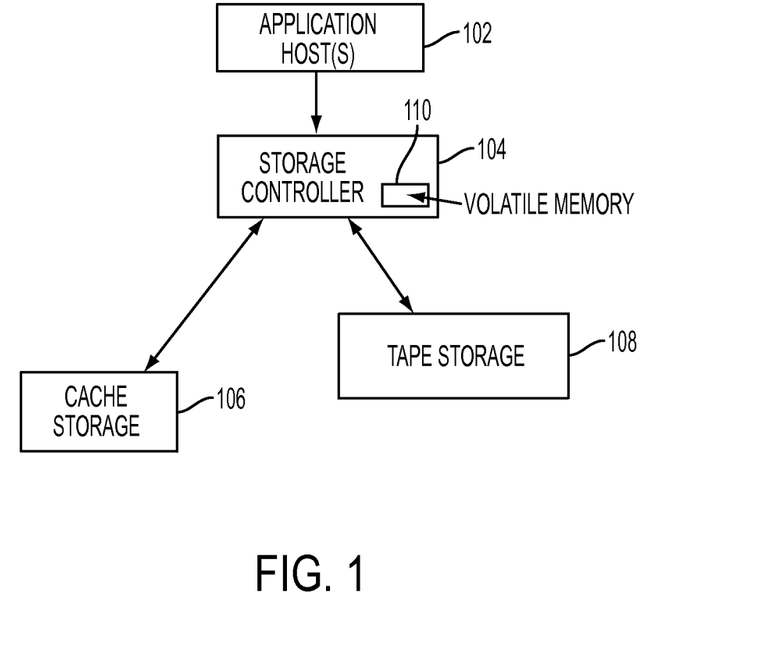
FIG. 1 is a block diagram of a system for providing fast write and management of persistent cache in accordance with an embodiment.

Turning now to FIG. 1, a block diagram of a system for providing fast write and management of persistent cache is generally shown in accordance with an embodiment. As shown in FIG. 1, one or more application host computers 102 are in communication with a storage controller 104. Also as shown in FIG. 1, the storage controller 104 is in communication with cache storage 106 and a main storage which is implemented in the embodiment shown in FIG. 1 by tape storage 108 (e.g., one or more tapes/tape devices). Embodiments of the cache management scheme (also referred to herein as a "cache manager") described herein can be implemented by logic located on the storage controller 104. Embodiments of the cache management scheme described herein can also be implemented by logic located on one or more of the application host(s) 102, the storage controller 104, and the tape storage 108. In an embodiment, the cache storage 106 is located in persistent storage (e.g., in secondary storage) so that contents of the cache storage 106 are not lost when power is turned off or during a restart process. In an embodiment, the storage controller 104 includes a volatile memory 110 (e.g., in primary storage) whose contents are lost when power is turned off or during a restart process. In an embodiment, all or a portion of the volatile memory 110 can be located on one or more application hosts 102.

As shown in FIG. 1, the storage controller 104 is separate from the application host(s) 102 and the cache storage 106. In another embodiment, one or more of the application host(s) 102, the storage controller 104, and the cache storage 106 are integrated into a single physical system. In an embodiment, all or a portion of the cache storage 106 is located on the storage controller 104 and/or one or more of the application hosts 102.

Examples of devices that may be utilized for the cache storage 106 include, but are not limited to serial attached small computer system interface (SAS) disks, solid state drives (SSDs), and flash devices.

Examples of devices that may be utilized for the volatile memory 110 include, but are not limited to direct random access memory (DRAM).

In an embodiment, the amount of data in a data access request from an application executing on the application host 102 can be much smaller in size than the block size of the cache storage 106. In an exemplary system, a tape device reads from or writes data to a tape in 64 megabyte blocks (e.g., for streaming purpose and to optimize tape capacity), while an access request from the application host 102 reads or writes data in 4,096 byte units. 4,096 bytes can also be expressed as 4 kibibytes (KiBs), with each KiB being made up of 1,024 bytes. A write request can include data that covers only a portion of a tape block, specified for example, by a logical block address (LBA) offset. Thus, a write request from the application host 106 requires a read of the entire block from the tape storage 108 or cache storage 106, followed by a write to the portion of the block specified by the write request.

In a storage system where tape devices are front-ended with cache devices, when a write request is received from an application host, a storage controller first checks to see if the block targeted by the write request is located in the cache storage. If the target block is in the cache storage ("write-hit"), then the write data associated with the write request is written to the block in the cache storage at the location in the block specified by the write request. If the target block is not in the cache storage ("write-miss"), then the storage controller reads the target block from the tape storage and writes the target block to the cache storage. Once the target block is in the cache storage, the write data associated with the write request is written to the block in the cache storage at the location in the block specified by the write request. Thus, when the target block is not in the cache, the latency to satisfy the write request includes the latency required to read the target block from the tape storage.

Embodiments described herein remove the latency required to read a target block from tape storage when a write-miss occurs by allowing the write request to complete after a "fast write" to persistent storage is performed. The reading of the block from the tape and reconciling the data can occur after the write request has completed. In embodiments, the fast write and a read to the tape are initiated at the same time. In other embodiments, the read to the tape is initiated after the fast write has completed. In further embodiments, the read to the tape is initiated based on some other event not related to the write request or write-miss, such as a requirement for space in the persistent storage.

Figure 2:
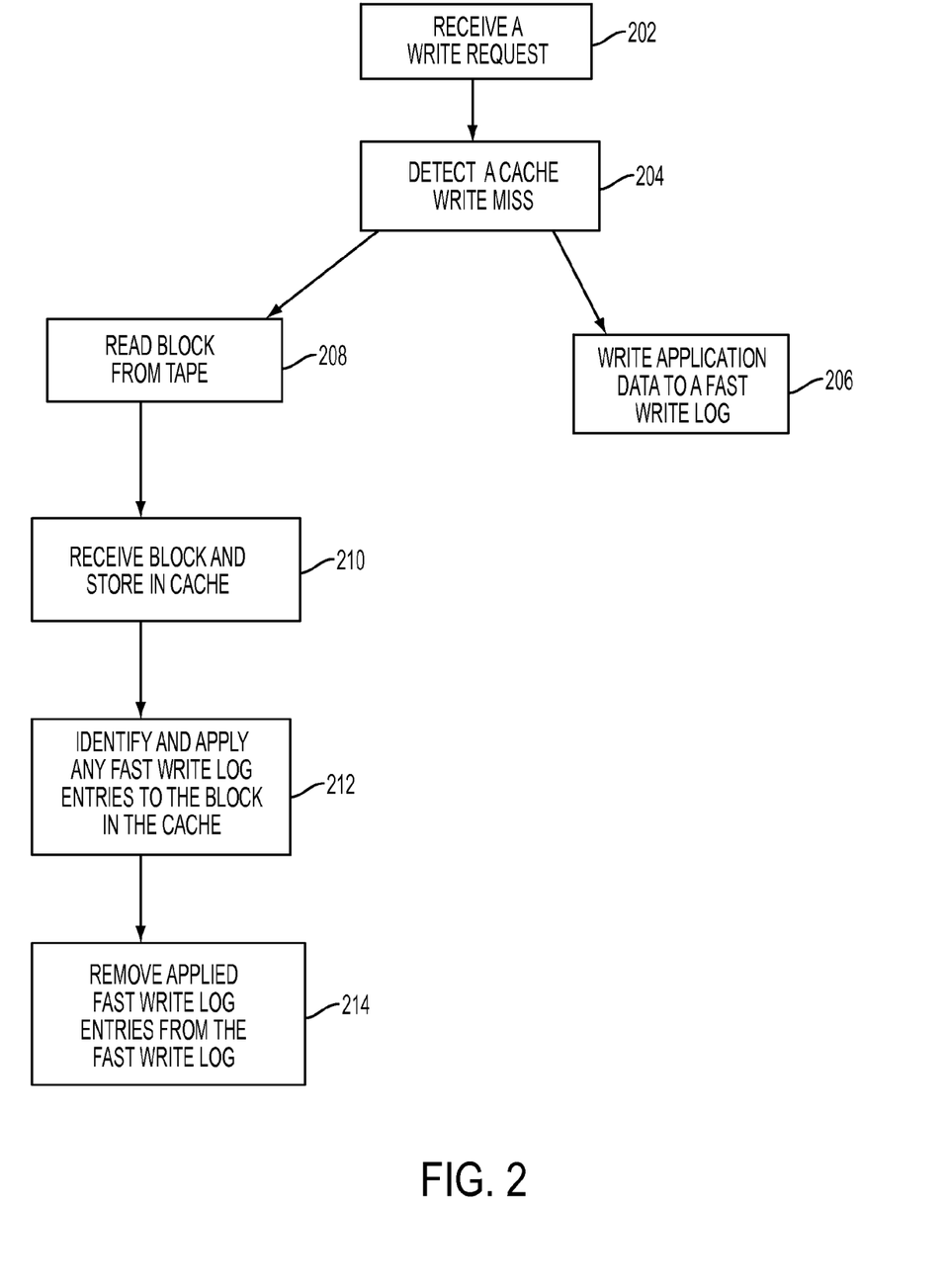
FIG. 2 illustrates a process flow for providing fast write and management of persistent cache in a system that includes tape storage and uses a traditional log in accordance with an embodiment.

Referring now to FIG. 2, a process flow for providing fast write and management of persistent cache in a system that includes tape storage and uses a traditional log is generally shown in accordance with an embodiment. The process flow shown in FIG. 2 can be performed by the cache manager executing on the storage controller 104. In an embodiment, the log (also referred to herein as the "fast write log") is stored in persistent storage and implemented for example, as a circular buffer. At block 202, a write request is received from an application host 102 and at block 204 a cache write-miss is detected. Processing continues at blocks 206 and 208. At block 206, the write data associated with the write request is recorded in the fast write log. Once block 206 is completed, the write request is completed and the storage controller 104 can process the next request. In an embodiment, each log entry includes the write data and a header (also referred to as metadata). The header contains the information for the write, such as: the logical block address (LBA) of the target block, the start offset of the write data in the target block, the end offset of the write data in the target block, and a log sequence number (LSN). In embodiments where the fast write log is used multiple writes to the same missed cache block (might be different offsets and lengths) results in multiple log entries.

At block 208, the storage controller 104 reads the target block from the tape storage 108 and at block 210 writes the target block to the cache storage 106. After a missed cache block is brought to persistent cache storage 106 from the tape storage 108, the corresponding fast write log entries can be merged with the cache block and the entries can be freed after merging. This merging and the freeing are performed in blocks 212 and 214. Contents of the cache storage 106 can be ejected and written back to the tape storage 108 according to established cache management policies.

A straightforward log apply process is to apply the entries from the oldest to the newest. For each to-be-applied entry, its data is copied to the cache block based on its start and end offset. After the copy, at block 214, the entry is removed from the log. This log apply process can be stopped after an entry is copied and removed, and then continue with the processing of newer entries later.

If there are lots of overlapped writes, applying log entries from oldest to newest can result in lots of unnecessary data copies. One optimization for getting rid of the unnecessary data copies is to apply the entries from the newest to oldest. A list containing (start_offset, end_offset) can be used to record the already-applied ranges and initially this list is null. For each to-be-applied entry, if there are overlaps between its (start, end) range and the already-applied ranges, the overlaps in the to-be-applied entry will be ignored when copying its data to the cache block. The log entry will be removed from the fast write log after it is applied to the cache block. The already-applied ranges will be updated if data copy is involved during applying this entry. The newest-to-oldest log applying process has to finish applying all log entries corresponding to the cache block and cannot stop in the middle of this process, in order to ensure consistency between the log entries and the cache block.

At block 212, all fast write log entries with the same LBA are identified and applied to the cache block. In embodiments, the log entries are ordered by their LSN, and the log entries can be indexed, or accessed, by LBA for faster operation. Without the lookup capability, the cache manager would need to scan the whole log to find the entries for a given LBA, and this can be time consuming. An LBA look up can be provided, for example, by additional metadata such as a memory map (referred to herein as the "fast write log map") for the fast write log. The memory map can be stored for example, in the volatile memory 110 and can be organized as a hash table that uses the LBA as the hash key. The fast write log map can be used to support fast merging of the log entries at block 212. The fast write log map can also be used by host read operations to check to see if data to satisfy a read request is stored in the fast write log. In an embodiment, a hash entry can represent the LBA ranges of the most recent writes to a cache block and can contain: minLSN which indicates the minimum LSN among all log entries for the corresponding cache block. The minLSN can be used to decide the order when merging the log entries with cache blocks. In addition, each hash entry can contain an "Array of [LBA range descriptor]" where overlapping LBA ranges for a block are resolved into non-overlapping ranges. In an embodiment, the LBA range descriptor includes the LBA offset in the block, the LBA range length, and the LSN.

An embodiment of a fast write log map follows:

At time t1: cache block "12" has data in the log due to host writes, in LSN order, as follows:

| | |
|---|---|
| LSN 121: LBA 20 (4 KiB write) | // LBA 20 later replaced by newer version |
| LSN 130: LBA 21 (4 KiB write) | // LBA 21 later replaced by newer version |
| LSN 145: LBA 0 - 3 (16 KiB write) | // LBA 2 later replaced by newer version |
| LSN 158: LBA 2 (4 KiB write) | |
| LSN 199: LBA 20 - 22 (12 KiB write) | |
| LSN 201: LBA 63 - 64 (8 KiB write) | |

Resulting Hash Table Entry:

hash(12)→{minLSN=145, array of {{offset=0, length=2, LSN=145},
　　　　　　　　　　　　　　　{ offset=2, length=1, LSN=158 },
　　　　　　　　　　　　　　　{ offset=3, length=1, LSN=145 },
　　　　　　　　　　　　　　　{ offset=20, length=3, LSN=199 },
　　　　　　　　　　　　　　　{ offset=63, length=2, LSN=201 }}

At time t2>t1: a subsequent host write to cache block "12":
　LSN 691: LBA 0-3 (16 KiB write)
　Resulting hash table entry:

hash(12)→{minLSN=199, array of {{ offset=0, length=4, LSN=691 },
　　　　　　　　　　　　　　　{offset=20, length=3, LSN=199 },
　　　　　　　　　　　　　　　{ offset=63, length=2, LSN=201 }}

The merge processing at block 212 can happen eagerly when the block is present in cache storage 106 or lazily when the log space is needed. In an embodiment, the merge order of the blocks is based on the minLSN of their hash map entries. For example, for a to-be-merged cache block: use its address to find the hash map entry; walk through each of its LBA range descriptors; find the log entry based on the LSN in the descriptor; and apply the appropriate part of the data (decided based on the LBA offset and length in the descriptor) in the log entry to the cache block With the fast write log, when a read request from the application host 102 is received, the memory controller 104 needs to check the fast write log first for the LBA of the read. If there are entries for the LBA, the entries need to be examined from the newest to the oldest to assemble the data for the read. The range of the read request is the initial read range. This assembly process determines if there is an overlap between the read range and log entry range. If there is an overlap, the log data for the overlap is a part of the data requested by the read and it will be used to assemble the data, and the read range will be updated by removing this overlap range. The assembly process will continue with the new read range and the older log entry, until the read range becomes null which means all data requested by the data are found, or the entries for the LBA are all examined. If all entries for the LBA are examined but the read range is not null yet, then the cache block for this LBA is needed to provide the data for the missed read range to fulfill the read request.

In an embodiment where a hash table is implemented, when a read request from the application host 102 is received, the memory controller 104 checks the fast write log using the hash table. If a hash entry exists for the block to be read, and the read range of the read request falls in the LBA range(s) of the hash entry, then the log entri(es) and data are read from the log based on the LBA range descriptor(s). If a hash entry exists for the block to be read, and the read range overlaps with the LBA range(s) of the hash entry, then the log entries are merged with the cache block (it could be a read-miss), and the data is read from the cache block. Otherwise the data is read from the cache storage 106 (it could be a read-miss).

In embodiments, blocks 206 and 208 are initiated by the storage controller 104 at the same time. In other embodiments, block 208 is initiated after block 206 (e.g., a specified amount of time/number of cycles after 206 is initiated, or a specified amount of time/number of cycles after 206 completes). In additional embodiments, the timing of the performing of blocks 206 and 208 are unrelated.

Figure 3:
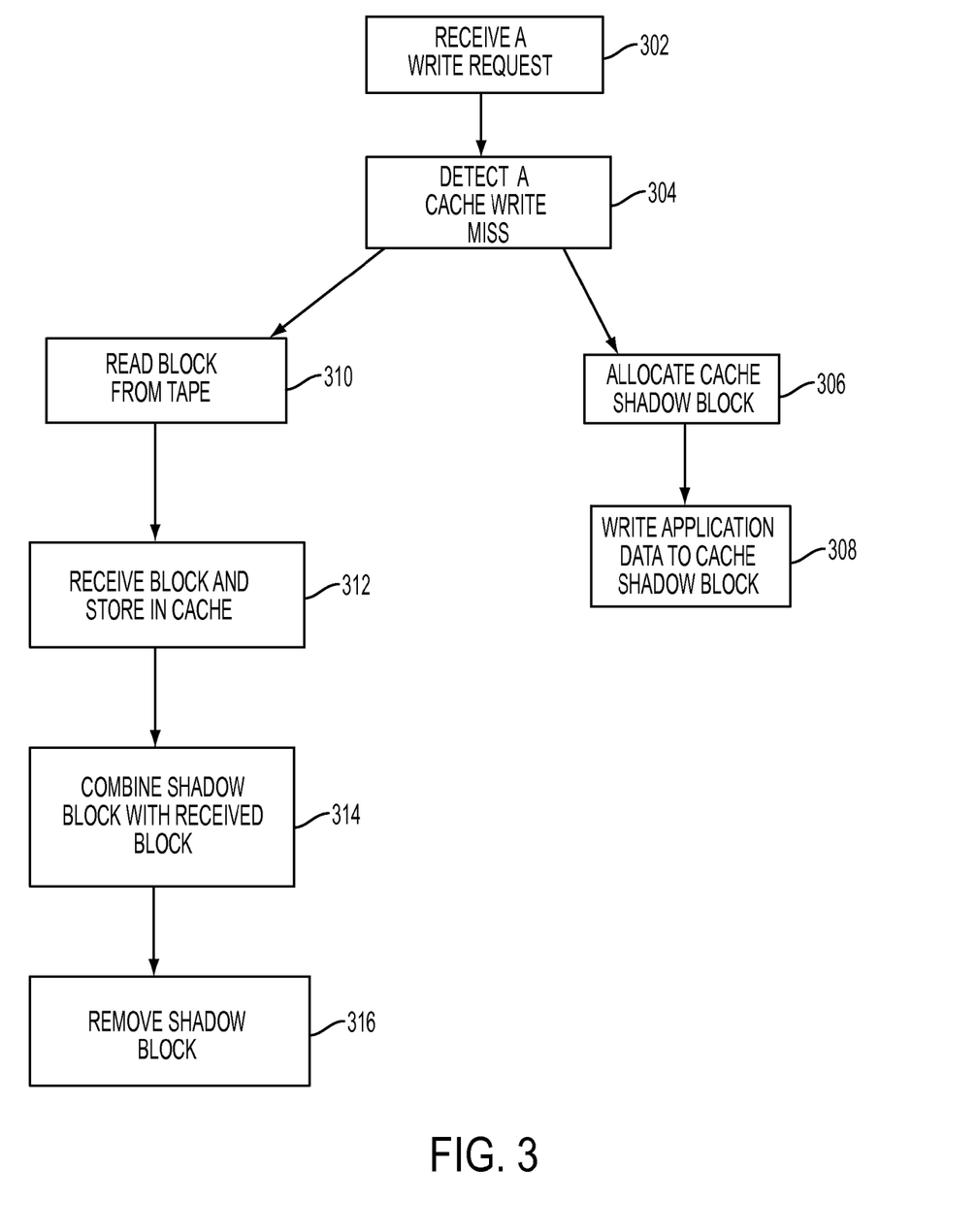
FIG. 3 illustrates a process flow for providing fast write and management of persistent cache in a system that includes tape storage and uses a shadow block in accordance with an embodiment.

Referring now to FIG. 3, a process flow for providing fast write and management of persistent cache in a system that includes tape storage and uses a shadow block is generally shown in accordance with an embodiment. The process flow shown in FIG. 3 can be performed by the cache manager executing on the storage controller 104. At block 302, a write request is received from an application host 102 and at block 304 a cache write-miss is detected. Processing continues at blocks 306 and 310. At block 306, the cache manager allocates a cache block in the cache storage 106 as a shadow block of the target block of the write request. In another embodiment the shadow block is located in persistent storage but not in the cache storage 106. At block 308, the write data associated with the write request is written to the shadow block. All subsequent writes to the missed target block can be applied to the shadow block as well as updates to the metadata of the shadow block. The metadata of the shadow block can include: Array of [LBA range], LBA range=(start LBA offset, end LBA offset). If the start LBA offset of an older write is smaller than the end LBA offset of a newer write, then their (start, end) can be combined. Once the processing at block 308 is completed, the write request is completed and the storage controller 104 can process the next request.

At block 310 of FIG. 3, the storage controller 104 reads the target block from the tape storage 108 and at block 312 writes the target block to the cache storage 106. After a missed cache block is brought to persistent cache storage 106 from the tape storage 108, block 314 is performed and the corresponding shadow block is merged with the cache block. The merging can be performed by walking through each of the shadow block LBA ranges and copying the data in the ranges from the shadow block to the cache block. In this manner, the corresponding shadow block can be combined with the cache block by copying all data which fall in the (start, end) array from the shadow block to the cache block. Once the merging is completed, block 316 is performed and the shadow block and its metadata are removed (or deleted). Contents of the cache storage 106 can be ejected and written back to the tape storage 108 according to established cache management policies.

In embodiments where shadow blocks are used and a read request is received, the storage controller 104 checks to see if a shadow block exists for the block targeted by the read request. If a shadow block does exist for the target block and the range of the read falls in one of the LBA ranges (as determined, e.g., based on the metadata), then the read request is serviced by reading the data from the shadow block. If the shadow block exists and the range of the read overlaps with its LBA range(s), then the storage controller 104 reads the target block from the cache storage 106 (it could be a read-miss and require a read from the tape storage 108), the data in the shadow block is merged with the cache block, and the read request is serviced by reading the data from the cache block in the cache storage 106. If none of the data requested by the read request is contained in the shadow block, then the storage controller 104 requests a read from the cache storage 106 (it could be read-miss).

The merge processing at block 314 can happen eagerly when the block is present in cache storage 106 or lazily when space is needed in the persistent storage. In embodiments, blocks 310 and 306 are initiated by the storage controller 104 at the same time. In other embodiments, block 310 is initiated after block 306 (e.g., a specified amount of time/number of cycles after 306 is initiated, or a specified amount of time/number of cycles after 306 completes). In additional embodiments, the timing of the performing of blocks 310 and 306 are unrelated.

Figure 4:
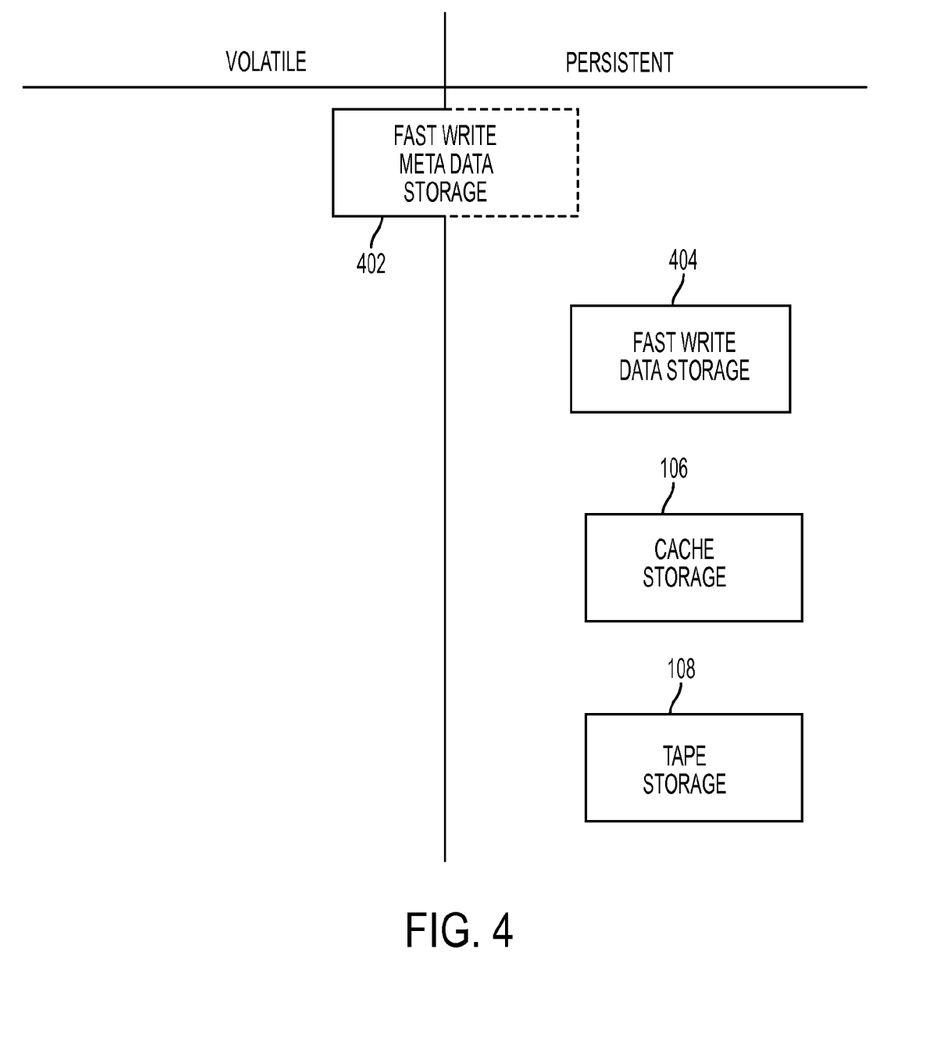
FIG. 4 is a block diagram of the types of storage utilized by a system for providing fast write and management of persistent cache in accordance with an embodiment.

Referring now to FIG. 4, a high level block diagram of the types of storage utilized by a system for providing fast write and management of persistent cache is generally shown in accordance with an embodiment. As shown in FIG. 4, the tape storage 108 and the cache storage 106 are both persistent types of storage. In addition, in embodiments, the fast write data storage 404 (containing e.g., the fast write log or the shadow blocks) is located in storage that is persistent. Also shown in FIG. 4, is fast write metadata storage 402 containing for example, a memory map or other metadata for the fast write log (e.g., headers) or shadow block metadata (e.g., LBA arrays). In embodiments, at least a subset of the fast write metadata storage 404 is located in storage that is volatile (e.g., volatile memory 110) and all of the data (e.g., fast write data storage 404, cache storage 106, and tape storage 108) is located in storage that is persistent.

Examples of devices that may be utilized for the persistent storage include, but are not limited to serial attached small computer system interface (SAS) disks, solid state drives (SSDs), and flash devices.

Because embodiments described herein support random access to a persistent fast write log, there is no requirement that fast write data be kept in volatile memory. This is contrasted with contemporary systems, where the fast write log can be used for recovery only, and so fast write data must be maintained in the volatile memory to improve read performance. This places an upper limit on the amount of fast write data that is available for subsequent reads based on the available amount of volatile memory. In embodiments described herein, only the metadata for the fast write log needs to be kept in volatile memory (which has a much smaller footprint) in order to support random reads. As a result, the persistent fast write log can be much larger than volatile memory for improved cache efficiency.

Various considerations can be taken into account when determining whether to use a fast write log or a shadow block for fast write data storage. Space may be one consideration. Embodiments of the shadow block have a large amount of space overhead because the size of the shadow block is the same as the size of the cache block. The size of its metadata in embodiments of the shadow block implementation can depend on how scattered the writes are on the LBA, but in general, the metadata is a very small fraction of the cache block. For small and not frequent writes, the fast write log has less space overhead because the size of each entry is the data size from the application host 102 plus a small amount of metadata.

Another consideration can be complexity. In general, the shadow block is less complicated than the fast write log, because first the writes are easily applied to the shadow block with simple metadata updates. This is contrasted with the fast write log where applying multiple log entries in the fast write log to the cache block is slower and more complex. In addition, it requires less processing to check the shadow block implementation for a read request when compared to the fast write log implementation. Thus, the shadow block is relatively easy to merge and its data structure is simple; and the fast write log uses a more complicated data structure (e.g. the hash map) and requires more work for merge.

Technical effects and benefits of embodiments include the ability to reduce the latency of a write-miss in a system that utilizes persistent cache as a front end to tertiary storage.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving a write request that includes a write data and an address of a target block in tertiary storage, wherein the tertiary storage is tape storage;

detecting a write-miss at a cache in response to the write request, the cache located in persistent storage; and in response to detecting the write-miss:
writing the write data and associated metadata to a fast write storage location in a fast write data storage and not to the cache, and marking the write request as complete, wherein the fast write data storage is separate from the cache;

retrieving the target block from the address in the tertiary storage;

storing the target block in the cache; and merging contents of the fast write storage location with the contents of the target block in the cache.

2. The method of claim 1, wherein the retrieving is initiated in parallel with or subsequent to the writing being initiated.

3. The method of claim 1, wherein the method further comprises:
receiving at least one additional write request that includes additional write data and the address of the target block in tertiary storage; and writing the additional write data and associated metadata to the fast write storage location and marking the at least one additional write request as complete.

4. The method of claim 1, wherein the retrieving, storing, and merging are further in response to the fast write storage location having less than a threshold amount of free space.

5. The method of claim 1, wherein the fast write storage is persistent storage.

6. The method of claim 1, further comprising:
receiving a request to read data from the target block;

determining whether all or a subset of the read data is located in the fast write storage location in response to receiving the request.

7. The method of claim 1, wherein the fast write data storage is persistent storage and the fast write storage location includes a log entry in a log.

8. The method of claim 7, wherein the writing further comprises updating a memory map in volatile storage based on the write data and associated metadata, the memory map provides an index into contents of the log, and the index is utilized by the merging to identify one or more log entries corresponding to the target block.

9. The method of claim 1, wherein the fast write storage location is a shadow cache block and the metadata indicates a starting and ending location of the write data in the target block.

10. The method of claim 1, wherein the metadata is stored in volatile memory in the fast write storage location.

11. A storage system, comprising:
a storage controller coupled to a cache storage and to a tertiary storage, the cadre storage comprising a persistent cache storage device, the storage system configured for:

receiving a write request that includes a write data and an address of a target block in the tertiary storage, wherein the tertiary storage is tape storage;

detecting a write-miss at the cache storage in response to the write request; and in response to detecting the write-miss:
writing the write data and associated metadata to a fast write storage location in a fast write data storage and not to cache, and marking the write request as complete, wherein the fast write data storage is separate from the cache;

retrieving the target block from the address in the tertiary storage; storing the target block in the cache storage; and merging contents of the fast write storage location with the contents of the target block in the cache storage.

12. The system of claim 11, wherein the retrieving is initiated in parallel with or subsequent to the writing being initiated.

13. The system of claim 11, wherein the storage system is further configured for:
receiving at least one additional write request that includes additional write data and the address of the target block in the tertiary storage; and writing the additional write data and associated metadata to the fast write storage location and marking the at least one additional write request as complete.

14. The system of claim 11, wherein the retrieving, storing, and merging are further in response to the fast write storage location having less than a threshold amount of free space.

15. The system of claim 11, wherein the fast write data storage is persistent storage.

16. The system of claim 11, wherein the storage system is further configured for:
receiving a request to read data from the target block;

determining whether all or a subset of the read data is located in the fast write storage location in response to receiving the request.

17. The system of claim 11, wherein:
the fast write data storage is persistent storage and the fast write storage location includes a log entry in a log, the writing further comprises updating a memory map in volatile storage based on the write data and associated metadata, the memory map provides an index into contents of the log, and the index is utilized by the merging to identify one or more log entries corresponding to the target block.

18. A computer program product comprising:
a computer readable storage medium having program code embodied therewith, the program code is executable by a processor to:

receive a write request that includes a write data and an address of a target block in tertiary storage, wherein the tertiary storage is tape storage;

detect a write-miss at a cache in response to the write request, the cache located in persistent storage; and in response to detecting the write-miss:
write the write data and associated metadata to a fast write storage location in a fast write data storage and not to the cache, and marking the write request as complete, wherein that fast write storage is separate from the cache;

retrieve the target block from the address in the tertiary storage; store the target block in the cache; and merge contents of the fast write storage location with the contents of the target block in the cache.

19. The computer program product of claim 18, wherein the retrieving is initiated in parallel with or subsequent to the writing being initiated.

* * * * *